(12) United States Patent
Ye et al.

(10) Patent No.: US 12,395,984 B2
(45) Date of Patent: Aug. 19, 2025

(54) METHODS FOR UPLINK CONTROL CHANNEL CARRIER SWITCHING

(71) Applicant: APPLE INC., Cupertino, CA (US)

(72) Inventors: Sigen Ye, San Diego, CA (US); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Seyed Ali Akbar Fakoorian, San Diego, CA (US); Wei Zeng, Saratoga, CA (US); Weidong Yang, San Digeo, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/905,215

(22) PCT Filed: Sep. 24, 2021

(86) PCT No.: PCT/CN2021/120366
§ 371 (c)(1),
(2) Date: Aug. 29, 2022

(87) PCT Pub. No.: WO2023/044766
PCT Pub. Date: Mar. 30, 2023

(65) Prior Publication Data
US 2024/0196390 A1    Jun. 13, 2024

(51) Int. Cl.
*H04W 72/1268* (2023.01)
*H04B 7/06* (2006.01)
(Continued)

(52) U.S. Cl.
CPC ...... *H04W 72/1268* (2013.01); *H04B 7/0626* (2013.01); *H04L 1/1812* (2013.01);
(Continued)

(58) Field of Classification Search
CPC ............. H04W 72/1268; H04W 72/11; H04W 72/0446; H04W 72/21; H04L 27/26025; H04L 1/1812; H04B 7/0626
See application file for complete search history.

(56) References Cited

U.S. PATENT DOCUMENTS

2016/0295575 A1    10/2016 Dinan
2020/0022175 A1    1/2020 Xiong et al.
(Continued)

FOREIGN PATENT DOCUMENTS

CN    113287355 A    8/2021
WO    2020191764 A1    10/2020

OTHER PUBLICATIONS

Ericsson, "HARQ-ACK Enhancements for IIoT/URLLC", R1-2106678, 3GPP TSG-RAN WG1 Meeting #106-e, e-Meeting, Agenda Item 8.3.1.1, Aug. 16-27, 2021, 22 pages.
(Continued)

*Primary Examiner* — Chandrahas B Patel
(74) *Attorney, Agent, or Firm* — Dorsey & Whitney LLP

(57) ABSTRACT

PUCCH carrier switching at a UE may include decoding an RRC configuration including a time-domain pattern indicating a reference cell and a target PUCCH cell for one or more PUCCH transmissions at a given point in time. The reference cell may include a reference cell slot numerology and the target PUCCH cell may include a target PUCCH cell slot numerology. A slot for PUCCH transmissions may be determined based on the reference cell slot numerology. The determined slot may be used for transmission of at least one of an SR, a CSI, and a HARQ-ACK. The determined slot of the reference cell may be mapped to a corresponding slot of the target PUCCH cell. A PUCCH resource may be determined for performing a PUCCH transmission using the corresponding slot of the target PUCCH cell. The PUCCH
(Continued)

resource determination may be based on a PUCCH configuration of the target PUCCH cell.

20 Claims, 9 Drawing Sheets

(51) Int. Cl.
    *H04L 1/1812*     (2023.01)
    *H04L 27/26*     (2006.01)
    *H04W 72/0446*     (2023.01)
    *H04W 72/11*     (2023.01)

(52) U.S. Cl.
    CPC ... *H04L 27/26025* (2021.01); *H04W 72/0446* (2013.01); *H04W 72/11* (2023.01)

(56) References Cited

U.S. PATENT DOCUMENTS

| | | | |
|---|---|---|---|
| 2021/0144716 A1 | 5/2021 | Choi et al. | |
| 2022/0329391 A1* | 10/2022 | Bae | H04L 1/1812 |
| 2023/0038444 A1* | 2/2023 | Huang | H04W 72/23 |
| 2023/0319830 A1* | 10/2023 | Liang | H04L 27/26025 |
| | | | 370/329 |
| 2024/0008024 A1* | 1/2024 | Jung | H04L 1/1812 |
| 2024/0188086 A1* | 6/2024 | Li | H04L 5/0055 |

OTHER PUBLICATIONS

Nokia, Nokia Shanghai Bell, "HARQ-ACK Feedback Enhancements for URLLC/IIoT", R1-2106636, 3GPP TSG RAN WG1 #106-e, e-Meeting, Agenda Item 8.3.1.1, Aug. 16-27, 2021, 27 pages.

PCT/CN2021/120366, International Search Report and Written Opinion, Jun. 10, 2022, 9 pages.

Moderator (Nokia), "Moderator summary #1 on HARQ-ACK feedback enhancements for NR Rel-17 URLLC/IIoT", R1-2106639, 3GPP TSG-RAN WG1 Meeting #106-e, e-Meeting, Agenda Item 8.3.1.1, Aug. 16-27, 2021, 68 pages.

Moderator (Nokia), "Moderator summary #3 on HARQ-ACK feedback enhancements for NR Rel-17 URLLC/IIoT", R1-2108546, 3GPP TSG-RAN WG1 Meeting #106-e e-Meeting, Agenda Item 8.3.1.1, Aug. 16-27, 2021, 265 pages.

Xiaomi, "UE feedback enhancements for HARQ-ACK", R1-2107917, 3GPP TSG RAN WG1#106-e, e-Meeting, Agenda Item 8.3.1.1, Aug. 16-27, 2021, 5 pages.

* cited by examiner

METHODS FOR UPLINK CONTROL CHANNEL CARRIER SWITCHING

TECHNICAL FIELD

This application relates generally to wireless communication systems, including uplink control channel carrier switching.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments. NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
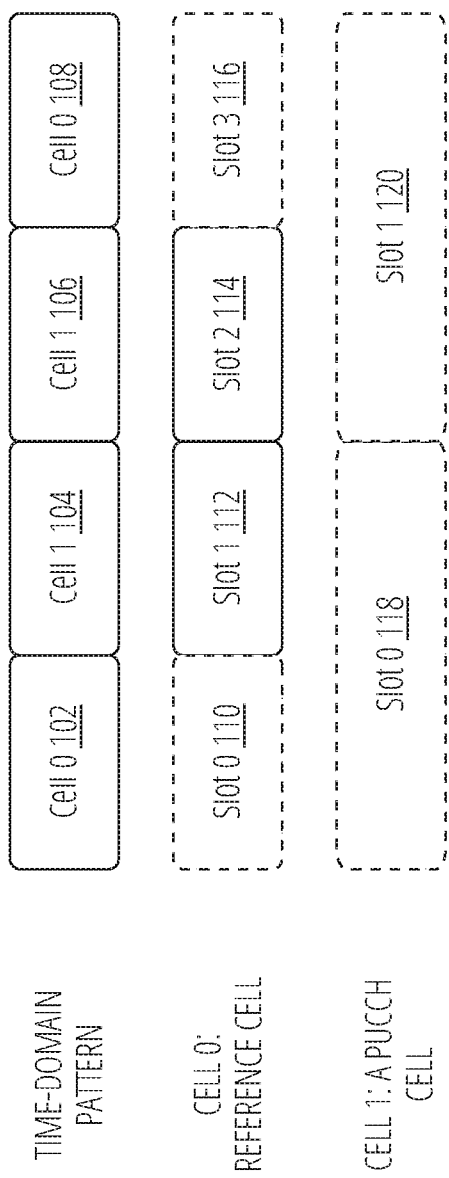
FIG. 1 illustrates a time-domain pattern in relation to reference cell slots and target PUCCH cell slots in accordance with one embodiment.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

By way of background, 3GPP Technical Specification Group Radio Access Network (TSG RAN) WG1 (RAN1) (i.e., Radio Layer 1 or Physical layer) agreements have included support for physical uplink control channel (PUCCH) carrier switching based on a dynamic indication in downlink control information (DCI) and semi-static configurations. Details regarding such support, however, are not yet clear. For instance, the applicability of dynamic and/or semi-static means may be further explored. The goal for any such support may include a minimum impact to already in-place specifications.

Notably, dynamic indication and/or semi-static configuration may be subject to separate UE capabilities. In addition, semi-static PUCCH carrier switching configuration operation may be based on radio resource control (RRC) configured PUCCH cell timing patterns of applicable PUCCH cells, and may support PUCCH carrier switching across cells with different numerologies. Additional rules potentially may also apply to support PUCCH carrier switching across cells with different numerologics. Furthermore, the following details may also be further studied: 1. A maximum number of PUCCH cells; 2. Whether and how to support joint operation of dynamic and semi-static carrier switching for a UE; and/or 3. Whether and how to support joint operation of PUCCH carrier switching and semi-persistent scheduling (SPS) hybrid automatic repeat request-acknowledgment (HARQ-ACK) deferral.

Other RAN1 agreements include: 1. For PUCCH carrier switching, the PUCCH configuration (i.e. pucch-Config/PUCCH-Configuration List) may be per uplink (UL) bandwidth part (BWP) (i.e. per candidate cell and UL BWP of that specific candidate cell). Channel state information (CSI) and scheduling requests (SRs) associated with such may be further studied; and 2. Semi-static PUCCH carrier switching may be applicable to all uplink control information (UCI) types, including HARQ-ACK, SR, and CSI.

In addition, the following RAN proposals related to PUCCH carrier switching may apply to the solutions described further herein, including: 1. For semi-static PUCCH carrier switching, time-domain pattern configurations may be based on the following properties: a. A single time-domain pattern configuration per PUCCH cell group; b. A granularity of the time-domain pattern may be one slot of the reference cell. Determination of the reference cell may be performed in any applicable manner. The notation of a reference cell may or may not have to be introduced in the RAN1 specification depending on the manner in which reference cells are ultimately determined; c. A time-domain pattern may be applied periodically while such period and pattern length may be of any applicable manner (e.g., 10 ms length, RRC configuration); and d. A pattern may define, for each slot of the reference cell, at least an applicable PUCCH cell; 2. For semi-static PUCCH carrier switching, the PDSCH to HARQ-ACK offset k1 (as further described herein) may be interpreted based on the numerology and PUCCH configuration of a reference cell with respect to applying the time-domain PUCCH carrier switching pattern; and 3. For semi-static PUCCH carrier switching, the PUCCH resource indicator (PRI) may be interpreted based on a PUCCH configuration of a determined target PUCCH cell.

Currently, PUCCH resource SR configurations are defined for each logical channel within a cell group (i.e., CellGroupConfig-->RLC-BearcrConfig-->LogicalChannel-Config-->SchedulingRequestId, where SchedulingRequestId points to an SR configuration that has a corresponding PUCCH-ResourceId that points to a PUCCH resource defined in PUCCH-config). For instance, the following may apply:

```
SchedulingRequestConfig ::=                SEQUENCE {
    schedulingRequestToAddModList          SEQUENCE (SIZE (1..maxNRofSR-
ConfigPerCellGroup)) OF SchedulingRequestToAddMod
                                                 OPTIONAL, -- Need N
    schedulingRequestToReleaseList         SEQUENCE (SIZE (1..maxNRofSR-
ConfigPerCellGroup)) OF SchedulingRequestId
                                                 OPTIONAL, -- Need N
}
SchedulingRequestToAddMod ::=              SEQUENCE {
    schedulingRequestId                    SchedulingRequestId,
    sr-ProhibitTimer                       ENUMERATED {ms1, ms2, ms8, ms16,
ms32, ms63, ms128}                         OPTIONAL, -- Need S
    sr-TransMax                            ENUMERATED { n4, n8, n16, n32, n64,
spare3, spare2, spare1}
}
and
SchedulingRequestResourceConfig ::=        SEQUENCE {
    schedulingRequestResourceId            SchedulingRequestResourceId,
    schedulingRequestID                    SchedulingrequestId,
    periodicityAndOffset                   CHOICE {
        sym2                                   NULL,
        sym6or7                                NULL,
        sl1                                    NULL, -- Recurs in every slot
        sl2                                    INTEGER (0..1),
        sl4                                    INTEGER (0..3),
        sl5                                    INTEGER (0..4),
        sl8                                    INTEGER (0..7),
        sl10                                   INTEGER (0..9),
        sl16                                   INTEGER (0..15),
        sl20                                   INTEGER (0..19),
        sl40                                   INTEGER (0..39),
        sl80                                   INTEGER (0..79),
        sl160                                  INTEGER (0..159),
        sl320                                  INTEGER (0..319),
        sl640                                  INTEGER (0..639),
    }
    resource                               PUCCH-ResourceId
}
```

Currently, PUCCH resource configurations for CSI are defined for each serving cell, but a list of PUCCH resources that correspond to each UL BWP of the serving cell are provided (e.g., ServingCellConfig-->CSI-MeasConfig-->CSI-ReportConfig-->CSI-ReportPeriodicityAndOffset and pucch-CSI-ResourceList, where CSI-ReportPeriodicityAndOffset is based on UL subcarrier spacing (SCS)). For instance, the following may apply:

```
CSI-ReportConfig ::=                        SEQUENCE {
    reportConfigId                          CSI-ReportConfigId,
    carrier                                 ServCellIndex          OPTIONAL, -- Need S
    resourcesForChannelMeasurement          CSI-ResourceConfigId   OPTIONAL, -- Need S
    csi-IM-ResourcesForInterference         CSI-ResourceConfigId   OPTIONAL, -- Need S
    nzp-CSI-RS-ResourcesForInterference     CSI-ResourceConfigId   OPTIONAL, -- Need S
    reportConfigType                        CHOICE {
        periodic                                SEQUENCE {
            reportSlotConfig                        CSI-ReportPeriodicityAndOffset,
            pucch-CSI-ResourceList                  SEQUENCE (SIZE
(1..maxNrofBWPs)) OF PUCCH-CSI-Resource
        },
        semiPersistentOnPUCCH                   SEQUENCE {
            reportSlotConfig                        CSI-ReportPeriodicityAndOffset
            pucch-CSI-ResourceList                  SEQUENCE (SIZE
(1..maxNrofBWPs)) OF PUCCH-CSI-Resource
        },
    and
PUCCH-CSI-Resource ::=                      SEQUENCE {
    uplinkBandwidthPartId                   BWP-Id,
    pucch-Resource                          PUCCH-ResourceId
}
```

Currently, with respect to PUCCH Resource Configurations for SPS HARQ-ACK: 1. With a single SPS configuration, a PUCCH resource is part of an SPS configuration; and 2. With multiple SPS configurations, a PUCCH resource is provided by sps-PUCCH-AN-List-r16 in a PUCCH-config. For example, the following may apply with respect to a single SPS configuration:

```
SPS-Config                          SEQUENCE {
    Periodicity                         ENUMERATED {ms10, ms20, ms32, ms40, ms64, ms80,
ms128, ms160, ms320, ms640, spare6, spare5, spare4, spare3, spare2, spare1},
    NrofHARQ-Processes                  INTEGER (1,8)
    n1PUCCH-AN                          PUCCH-ResourceId         OPTIONAL, -- Need M
    mcs-Table                           ENUMERATED {qam64LowSE}  OPTIONAL, -- Need S
    In contrast, for example, the following may apply with respect to multiple SPS
configurations:
SPS-PUCCH-AN-List-r16 ::=           SEQUENCE (SIZE(1..4)) OF SPS-PUCCH-AN-r16
and
SPS-PUCCH-AN-r16 ::=                SEQUENCE {
    Sps-PUCCH-AN-ResourceId-r16         PUCCH-ResourceId,
    maxPayloadSize-r16                  INTEGER (4...256)        OPTIONAL -Need R
}
```

Notably, R1-2108547, Final moderator summary on HARQ-ACK feedback enhancements for NR Rel-17 URLLC/IIoT, Moderator (Nokia), RAN1 #806-e may provide a reference for at least some of the above background information.

With respect to semi-static PUCCH carrier switching, the following baseline assumptions may apply: 1. A time-domain pattern may be configured per PUCCH group to indicate a target PUCCH cell for each slot of a reference cell. Notably, the reference cell may be defined in any applicable way when practicing the principles described herein (e.g., the reference cell can be the PCell/PSCell, the reference cell can be the cell with the smallest SCS, the reference cell can be configured by the gNB, and so forth); 2. A PUCCH configuration may be per UL BWP per PUCCH cell; and 3. Restrictions may be imposed on a time-domain pattern configuration, as further illustrated and described with respect to FIG. 1.

For dynamic HARQ-ACK, a PDSCH-to-HARQ feedback indicator field (K1) of downlink control information (DCI) may be interpreted based on a numerology and configuration of a reference cell, which may allow a UE to determine the timing of the HARQ-ACK feedback and a target PUCCH cell based on the configured time-domain pattern. A PUCCH resource indication (PRI) may then be interpreted using a PUCCH configuration of the target PUCCH cell. Accordingly, the K1 field may indicate a timing to determine the target PUCCH cell while the PRI indicates the actual PUCCH resource to be utilized for transmitting the HARQ-ACK.

The principles described herein provide solutions for the way in which a PUCCH resource determination is handled for SR, CSI, and SPS HARQ-ACK, as well as the way in which UCI multiplexing is handled when PUCCHs overlap in time or PUCCH(s) and PUSCH(s) overlap in time are further described herein.

These solutions (which are further described below) may include one or more restrictions/assumptions associated with time-domain pattern configurations. In particular, in the case of mixed numerology, one slot on one cell may overlap with multiple slots on another cell. The time-domain pattern for a target PUCCH cell may be defined with the granularity of a slot of a reference cell. If there is no restriction on a configured time-domain pattern, the issue presented in FIG. 1 may occur.

As illustrated. FIG. 1 includes a time-domain pattern comprising a first portion 102, second portion 104, third portion 106, and fourth portion 108, a reference cell (i.e., Cell 0) that includes a Slot 0 110, a Slot 1 112, a Slot 2 114, and a Slot 3 116, and a PUCCH cell (i.e., Cell 1) that includes a Slot 0 118 and a Slot 1 120. As shown, the first portion 102 of the time-domain pattern indicates use of the reference cell (i.e., corresponding to Slot 0 110 of the reference cell), the second portion 104 indicates use of the PUCCH cell (i.e., corresponding to Slot 0 118 of the PUCCH cell, which overlaps with Slot 0 110), the third portion 106 indicates use of the PUCCH cell (i.e., corresponding to Slot 1 120 of the PUCCH cell, which overlaps with Slot 3 116), and the fourth portion 108 indicates use of the reference cell (i.e., corresponding to Slot 3 116 of the reference cell, which overlaps with Slot 1 120 of the PUCCH cell). Because multiple slots of the reference cell occur within a single slot of the PUCCH cell, the time-domain pattern may cause overlap of indicated cell slots to be used. In other words, a target PUCCH slot on one cell (e.g., Slot 0 110 of the reference cell/Cell 0) may overlap with a target PUCCH slot on another cell (e.g., Slot 0 118 of the PUCCH cell/Cell 1). Such scenarios may create additional complicated scenarios cases that would have to include resolving such overlapping (e.g., by multiplexing or dropping). To avoid such unnecessary complication, time-domain patterns may be restricted such that a target PUCCH slot on one cell does not overlap with a target PUCCH slot on another cell.

Figure 2:
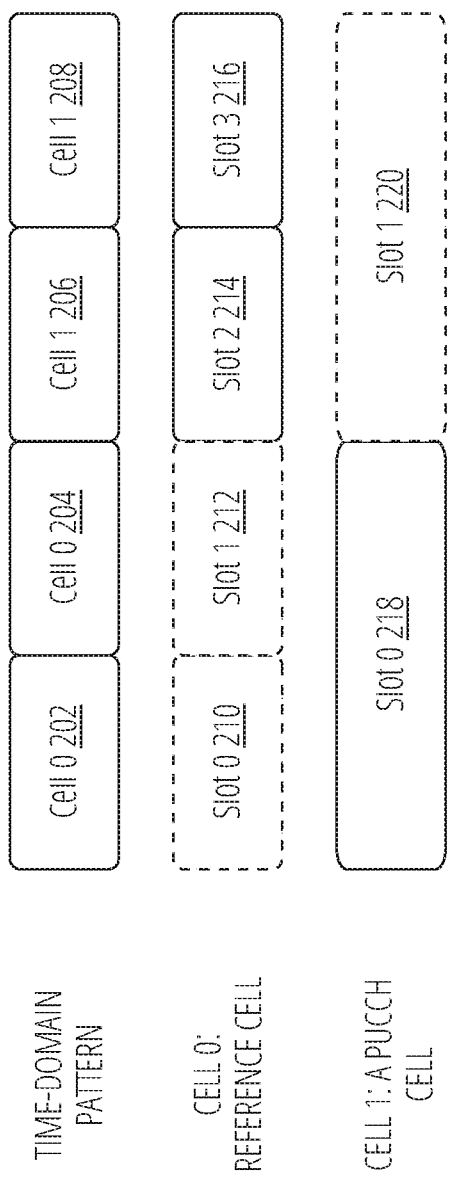
FIG. 2 illustrates a time-domain pattern in relation to reference cell slots and target PUCCH cell slots in accordance with one embodiment.

For instance, FIG. 2 illustrates an example of a time-domain pattern that would be allowed under such restrictions (i.e., in contrast to the scenario of FIG. 1, which may not be allowed under the foregoing restrictions). As shown, FIG. 2 includes a time-domain pattern comprising a first portion 202, second portion 204, third portion 206, and fourth portion 208, a reference cell (i.e., Cell 0) that includes a Slot 0 210, a Slot 1 212, a Slot 2 214, and a Slot 3 216, and a PUCCH cell (i.e., Cell 1) that includes a Slot 0 218 and a Slot 1 220. As shown, the first portion 202 and the second portion 204 of the time-domain pattern indicate use of the reference cell (i.e., corresponding to the Slot 0 210 and the Slot 1 212 of the reference cell), and the third portion 206 and the fourth portion 208 of the time-domain pattern indicate use of the PUCCH cell (i.e., corresponding to the Slot 1 220 of the PUCCH cell). Accordingly, such time-domain pattern may be allowed as it does not cause any overlapping use of slots between the reference cell and the PUCCH cell.

Figure 3:
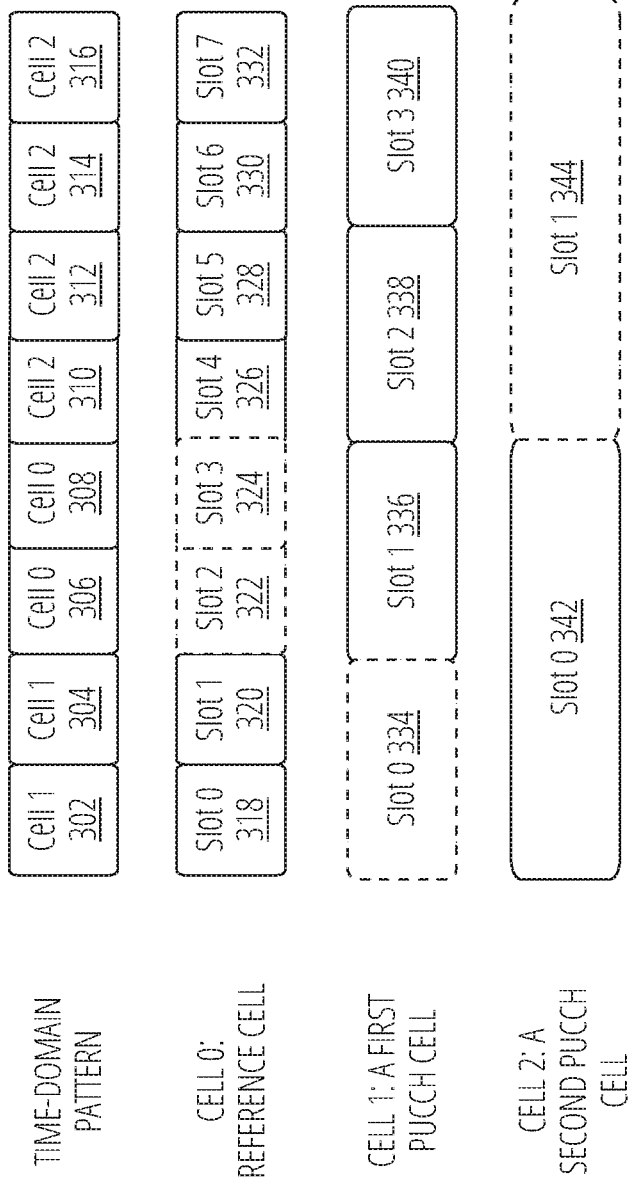
FIG. 3 illustrates a time-domain pattern in relation to reference cell slots and target PUCCH cell slots in accordance with one embodiment.

FIG. 3 illustrates another example of a time-domain pattern that would be allowed under such restrictions. As shown, FIG. 3 includes a time-domain pattern comprising a first portion 302, second portion 306, third portion 308, fourth portion 310, a fifth portion 312, a sixth portion 314, and a seventh portion 316, a reference cell (i.e., Cell 0) that includes a Slot 0 318, a Slot 1 320, a Slot 2 322, a Slot 3 324, a Slot 4 326, a Slot 5 328, a Slot 6 330, and a Slot 7 332, a first PUCCH cell (i.e., Cell 1) that includes a Slot 0 334, a Slot 1 336, a Slot 2 338, and a Slot 3 340, and a PUCCH cell (i.e., Cell 2) that includes a Slot 0 342 and a Slot 1 344. As shown, the first portion 302 and the second portion 306 of the time-domain pattern indicate use of the first PUCCH cell (i.e., corresponding to the Slot 0 334 of the first PUCCH cell), the third portion 206 and the fourth portion 208 of the time-domain pattern indicate use of the reference cell (i.e., corresponding to the Slot 2 322 and the Slot 3 324 of the reference cell), and the fourth portion 310, the fifth portion 312, the sixth portion 314, and the seventh portion 316 of the time-domain pattern indicate use of the second PUCCH cell (i.e., corresponding to the Slot 1 344 of the second PUCCH cell). Accordingly, such time-domain pattern may be allowed as it does not cause any overlapping use of slots between the reference cell, the first PUCCH cell, and the second PUCCH cell.

As further described above, solutions regarding PUCCH resource determination for SR, CSI and SPS HARQ-ACK will now be described. Initially, it should be noted that PUCCH resource determination for SR, CSI and SPS HARQ-ACK could potentially follow legacy behavior (i.e., deriving based on the configuration of the PCell/PSCell). Alternatively, these can be derived based on the configuration of the reference cell, which logically follows because of the time-domain pattern being based on the numerology of the reference cell.

Regardless, the following issues also have to be handled: 1. If the PUCCH is to be transmitted, given that PUCCH has to be transmitted on a target PUCCH cell (based on the semi-static pattern), a PUCCH resource to be used on the target PUCCH cell has to be determined; and 2. The UE may also have semi-statically-configured PUCCH on a PCell/PSCell and dynamic PUCCH on the target PUCCH cell. UCI multiplexing across different cells may also have to be defined.

Considering these issues, the general solution may include the following (which is described in further detail below): 1. The slot for the PUCCH for SR, CSI, and SPS HARQ-ACK is determined based on a numerology of the reference cell; 2. The slot on the reference cell is mapped to a slot on the target PUCCH cell, with potential pruning of PUCCHs in case of mixed numerology; and 3. The PUCCH resource is determined based on the PUCCH configuration of the target PUCCH cell.

As briefly described above, the slot for the PUCCH for SR, CSI, and SPS HARQ-ACK is determined based on the reference cell numerology. In particular, with respect to SR, "periodicityAndOffset" is interpreted based on the numerology of the reference cell. With respect to CSI, "CSI-ReportPeriodicityAndOffset" is also interpreted based on the numerology of the reference cell. Finally, with respect to SPS HARQ-ACK, K1 is indicated in an activation DCI and is interpreted based on the numerology of the reference cell (same as dynamic HARQ-ACK), Notably, in the special case where the reference cell is PCell, already existing behaviors may be utilized. In an example, the following may apply:

```
CSI-ReportConfig ::=              SEQUENCE {
    reportConfigId                CSI-ReportConfigId,
    carrier                       ServCellIndex           OPTIONAL, -- Need S
    resourcesForChannelMeasurement   CSI-ResourceConfigId    OPTIONAL, -- Need S
    csi-IM-ResourcesForInterference  CSI-ResourceConfigId    OPTIONAL, -- Need S
    nzp-CSI-RS-ResourcesForInterference CSI-ResourceConfigId OPTIONAL, -- Need S
    reportConfigType              CHOICE {
        periodic                  SEQUENCE {
            reportSlotConfig          CSI-ReportPeriodicityAndOffset,
            pucch-CSI-ResourceList    SEQUENCE (SIZE
                (1..maxNrofBWPs) OF PUCCH-CSI-Resource
        },
        semiPersistentOnPUCCH     SEQUENCE {
```

-continued

```
        reportSlotConfig                    CSI-ReportPeriodicityAndOffset
        pucch-CSI-ResourceList              SEQUENCE (SIZE
(1..maxNrofBWPs)) OF PUCCH-CSI-Resource
    },
and
SchedulingRequestResourceConfig ::=         SEQUENCE {
    schedulingRequestResourceId                SchedulingRequestResourceId,
    schedulingRequestID                        SchedulingRequestId,
    periodicityAndOffset                       CHOICE {
        sym2                                        NULL,
        sym6or7                                     NULL,
        sl1                                         NULL, -- Recurs in every slot
        sl2                                         INTEGER (0..1),
        sl4                                         INTEGER (0..3),
        sl5                                         INTEGER (0..4),
        sl8                                         INTEGER (0..7),
        sl10                                        INTEGER (0..9),
        sl16                                        INTEGER (0..15),
        sl20                                        INTEGER (0..19),
        sl40                                        INTEGER (0..39),
        sl80                                        INTEGER (0..79),
        sl160                                       INTEGER (0..159),
        sl320                                       INTEGER (0..319),
        sl640                                       INTEGER (0..639),
    }
    resource                                PUCCH-ResourceId
}
```

Again, as briefly described above, reference cell slots may be mapped to target PUCCH cell slots (with a potential pruning of PUCCHs in scenarios that include mixed numerology). In particular, three different scenarios may arise that each include a unique solution.

Figure 4:
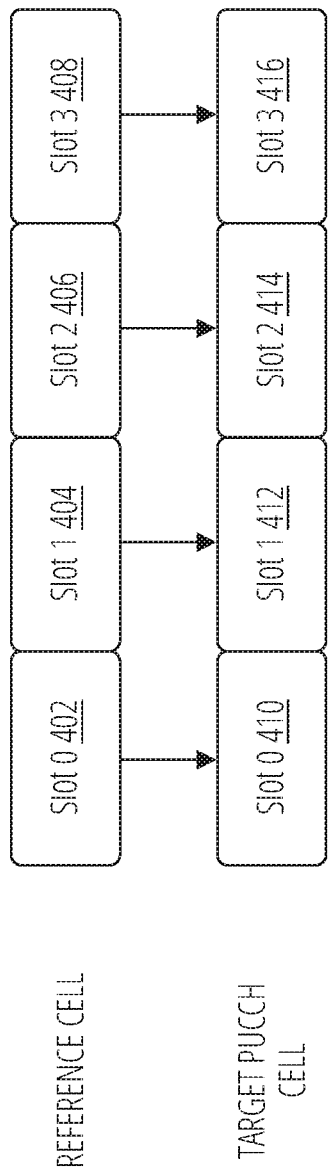
FIG. 4 illustrates a mapping of reference cell slots to target PUCCH cell slots in accordance with one embodiment.

In a first scenario, the reference cell slots and the target PUCCH cell slots may include a same numerology, which results in a straightforward 1-to-1 mapping. Such scenarios avoid PUCCH pruning. FIG. 4 illustrates a mapping of reference cell slots to target PUCCH cell slots when the two cells have the same numerology. As shown, FIG. 4 includes a reference cell having Slot 0 402, Slot 1 404, Slot 2 406, and Slot 3 408 and a target PUCCH cell having a Slot 0 410, a Slot 1 412, a Slot 2 414, and a Slot 3 416. Each of these slots of the reference cell (e.g., Slot 0 402, Slot 1 404, and so forth) may be mapped 1-to-1 to the corresponding slots of the target PUCCH cell (e.g., Slot 0 410, Slot 1 412, and so forth) because these two cells have slots with the same numerology.

In a second scenario, the SCS of the reference cell is smaller than the SCS of the target PUCCH cell. In such scenarios, because one slot on the reference cell overlaps with multiple slots on the target PUCCH cell, one or more rules have to be defined to map reference cell slots to one of the multiple target PUCCH slots. For instance, in some embodiments, reference cell slots may be mapped to a first overlapping slot of the target PUCCH cell. In other embodiments, reference cell slots may be mapped to a last overlapping slot of the target PUCCH cell. In yet other embodiments, mapping of reference cell slots to overlapping target PUCCH cell slots may be based on a provided configuration. Regardless of the particular mapping, PUCCH pruning may again be avoided in such scenarios.

Figure 5:
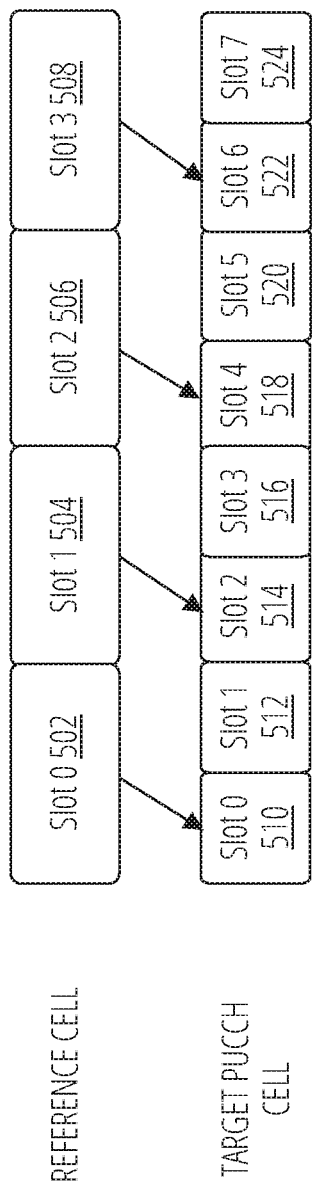
FIG. 5 illustrates a mapping of reference cell slots to target PUCCH cell slots in accordance with one embodiment.

FIG. 5 illustrates a mapping of reference cell slots to target PUCCH cell slots when the SCS of the reference cell is smaller than the SCS of the target PUCCH cell. As shown, FIG. 5 includes a reference cell having Slot 0 502, Slot 1 504, Slot 2 506, and Slot 3 508 and a target PUCCH cell having a Slot 0 510, a Slot 1 512, a Slot 2 514, a Slot 3 516, a Slot 4 518, a Slot 5 520, a Slot 6 522, and a Slot 7 524. Each of these slots of the reference cell (e.g., Slot 0 502, Slot 1 504, and so forth) may be mapped to a single overlapping corresponding slot of the target PUCCH cell (e.g., Slot 0 510, Slot 1 512, and so forth), as further described above. While numerous options may be available for such mapping, FIG. 5 illustrates each reference cell slot being mapped to a first corresponding overlapping slot of the target PUCCH cell (e.g., Slot 0 502 of the reference cell to Slot 0 510 of the target PUCCH cell, Slot 1 504 of the reference cell to Slot 2 514 of the target PUCCH cell, and so forth).

In a third scenario, the SCS of the reference cell is greater than the SCS of the target PUCCH cell. Accordingly, multiple slots of the reference cell overlap (or map to) a single slot of the target PUCCH cell. As such, some PUCCHs may be pruned in this third scenario.

Based on the complexity of the third scenario, multiple options may be utilized, including the following: 1. The UE does not expect PUCCHs in multiple slots of the reference cell that map to the same slot of the target PUCCH cell; 2. Only PUCCHs in one of the overlapping slots of the reference cell is mapped to the corresponding slot of the target PUCCH cell, while the PUCCHs in other slots are dropped. For instance, the mapped slot can be the first overlapping slot, can be the last overlapping slot, or can follow a configuration. Utilizing this option may allow simple multiplexing behavior (i.e., reusing 3GPP Release 15 (Rel-15) behavior); 3. As an enhancement of option 2, pruning may be applied to SR and CSI, but not SPS HARQ-ACK. In other words, SPS HARQ-ACK can still be mapped from multiple slots of the reference cell to a single slot of the target PUCCH cell in such embodiments; 4. If the same SR/CSI configuration has PUCCHs in multiple overlapping slots on the reference cell, only one of such slots is kept and mapped to the target PUCCH cell. Pruning like this has to happen if such slots are mapped to the same PUCCH resource on the target PUCCH cell, as further described below. Notably, a UE does not have to transmit multiple SRs or multiple CSI reports for the same configuration. In addition, for SR, if at least one of the SR occasions is positive, the SR can be positive on the target PUCCH cell.

Figure 6:
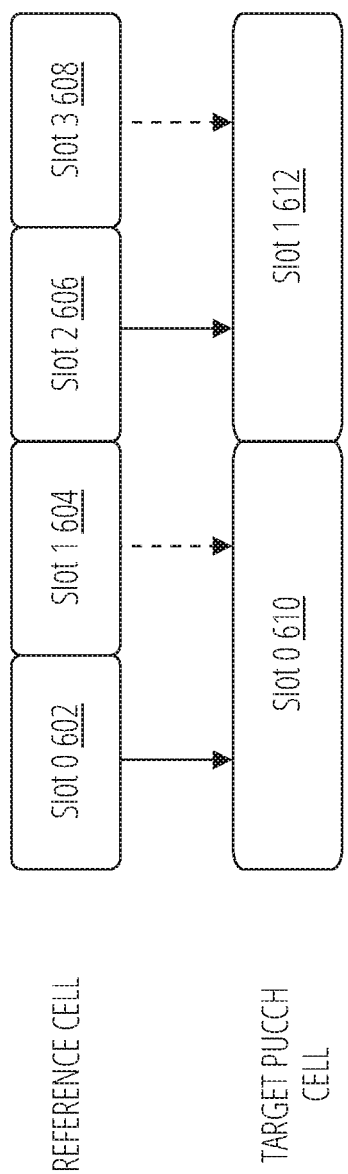
FIG. 6 illustrates a mapping of reference cell slots to target PUCCH cell slots in accordance with one embodiment.

FIG. 6 illustrates a mapping of reference cell slots to target PUCCH cell slots when the SCS of the reference cell is greater than the SCS of the target PUCCH cell. As shown, FIG. 6 includes a reference cell having Slot 0 602, Slot 1 604, Slot 2 606, and Slot 3 608 and a target PUCCH cell having a Slot 0 610 and Slot 1 612. Only one of the overlapping slots of the reference cell (i.e., Slot 0 602 and Slot 1 604 with respect to Slot 0 610, and Slot 2 606 and Slot 3 608 with respect to Slot 1 612)) may be mapped to a single overlapping corresponding slot of the target PUCCH cell (e.g., Slot 0 610 and Slot 1 612), as further described above. While numerous options may be available for such mapping, FIG. 6 illustrates the first overlapping reference cell slot being mapped to a corresponding slot of the target PUCCH cell (e.g., Slot 0 602 of the reference cell to Slot 0 610 of the target PUCCH cell and Slot 2 606 of the reference cell to Slot 1 612 of the target PUCCH cell).

A PUCCH resource may then be determined based on a PUCCH configuration of the target PUCCH cell. For instance, in a first option, the existing parameter for PUCCH resource ID may be interpreted based on a PUCCH configuration of the target PUCCH cell. One drawback to this approach is that for the same configuration, the target PUCCH cell may be different for different occasions. Having only a single PUCCH resource ID may limit the configuration flexibility at the base station (e.g., gNB) for the PUCCH resources configured for the multiple cells.

In a second option, the UE may be configured with a list of PUCCH resource IDs that each correspond to one of a number of candidate PUCCH cells. Accordingly, for each target PUCCH cell, the corresponding PUCCH resource ID may be used. For instance, with respect to SR, instead of PUCCH-ResourceID, "SEQUENCE (SIZE(1 . . . maxNrOf-PucchCells)) OF PUCCH-ResourceID" or similar may be used. Furthermore, assuming there are two PUCCH cells and the SR is configured with two PUCCH resource IDs (e.g., (5, 8)), the UE may use PUCCH resource #5 according to a PUCCH-config for the first PUCCH cell when the target PUCCH cell is the first PUCCH cell) or PUCCH resource #8 according to a PUCCH-config for the second PUCCH cell when the target PUCCH cell is the second PUCCH cell.

CSI may be handled similarly. In particular, for CSI, "pucch-CSI-ResourccList" may be included in the CSI configuration and include a sequence of resource configurations where each such resource corresponds to one of the PUCCH cells.

For SPS HARQ-ACK, the existing "n1PUCCH-AN," "sps-PUCCH-AN-List-r16," or "sps-PUCCH-AN-ResourceID-r16" can be extended to include a list of such configurations for multiple PUCCH cells.

Finally, after the above procedures/solutions have been occurred, UCI multiplexing may be applicable. In particular, once all the PUCCH resources (i.e., HARQ-ACK, SR, CSI) are determined for a given slot on the target PUCCH cell (in addition to the other procedures/solutions described above including determining slots for PUCCH regarding SR, CSI, and SPS HARQ-ACK and mapping reference cell slots to target PUCCH cell slots), such PUCCHs may overlap in time or may overlap with PUSCH(s) in time. In such cases, UCI multiplexing on PUCCH/PUSCH may be applicable.

In particular, for the first and second scenarios related to slot mapping discussed above, Rel-15 UCI multiplexing procedure can be directly reused because the maximum number of PUCCHs for each UCI type may be exactly the same as in Rel-15.

For the third scenario related to slot mapping discussed above, however, various procedures/solutions may be utilized. For instance, with respect to handling dynamic HARQ-ACKs, the following options may be utilized: 1. The UE may not expect HARQ-ACK to be scheduled in multiple slots on the reference cell that correspond to the same slot on the target PUCCH cell (this option may be best used together with either the first or second option for the third scenario discussed above, in which case the Rel-15 UCI multiplexing procedure can again be directly reused); 2. The UE may be scheduled with HARQ-ACK in multiple slots on the reference cell that correspond to the same slot on the target PUCCH cell, which may further include the following sub-options: a. Dynamic HARQ-ACK payloads are concatenated in multiple slots in a pre-defined order (e.g., based on a configuration) and the PUCCH resource is determined based on a PRI indication in a last DCI for HARQ-ACK and the total HARQ-ACK payload; or b. If the PUCCHs carrying a HARQ-ACK on the target cell do not overlap, each can be transmitted. Otherwise, the HARQ-ACK payload are concatenated (similar to sub-option a). Sub-option b may also include the UE supporting multiple PUCCH transmissions carrying a HARQ-ACK within a slot.

For the third scenario, when handling SPS HARQ-ACK in cases having multiple PUCCHs for SPS HARQ-ACK mapped to the same slot on target PUCCH cell (i.e., options 3 and 4 of the third scenario described above with respect to slot mapping), the SPS HARQ-ACK payload can be concatenated in a pre-defined order (e.g., based on a configuration) and the PUCCH resource may be determined based on the SPS PUCCH configuration of the target PUCCH cell.

Furthermore, if dynamic HARQ-ACK is utilized, Options 2a and 2b, related to the handling of dynamic HARQ-ACKs discussed above, can be extended to also include the SPS HARQ-ACK payload by concatenating the SPS HARQ-ACK and the dynamic HARQ-ACK payload together. In particular, with respect to option 2a, the concatenation order may comprise the concatenated dynamic HARQ-ACK followed by the concatenated SPS HARQ-ACK. Alternatively, the dynamic HARQ-ACK and SPS HARQ-ACK may be concatenated within a slot on the reference cell, followed by concatenating the HARQ-ACK in different slots together. With respect to option 2b, the dynamic HARQ-ACK and SPS HARQ-ACK may be concatenated within a slot on the reference cell, followed by utilizing option 2b to resolve any potential overlapping.

Once the handling of HARQ-ACK is complete, Rel-15 multiplexing procedures can be reused to multiplex UCI on PUCCH/PUSCH. In addition, Rel-15 multiplexing handling may also be used for SR and CSI. An enhancement to such procedures may be included in the UCI multiplexing procedure on PUCCH/PUSCH according to the following: 1. In cases where two or more PUCCHs are carrying a HARQ-ACK overlap, the HARQ-ACK payload can be concatenated and multiplexed on the same PUCCH; and/or 2. In cases where two or more PUCCHs carrying HARQ-ACK overlap with a PUSCH, the HARQ-ACK payload can be concatenated and multiplexed on the same PUSCH. In addition, the UL-downlink assignment index (DAI) in the UL DCI may be applied after concatenating the HARQ-ACK payload.

Notably, if there are two physical layer (PHY) priorities, the described procedures can be followed for each priority. In such cases, however, a single time-domain pattern may apply to both PHY priorities. Furthermore, while examples provided herein are generally described with respect to cases having PUCCH switching between two cells, the solutions described herein equally apply to cases having more than two cells. In addition, if sub-slot-based HARQ-ACK feedback is configured for a PUCCH cell, "slot" can be replaced by "sub-slot" for that cell in the described solutions.

Figure 7:
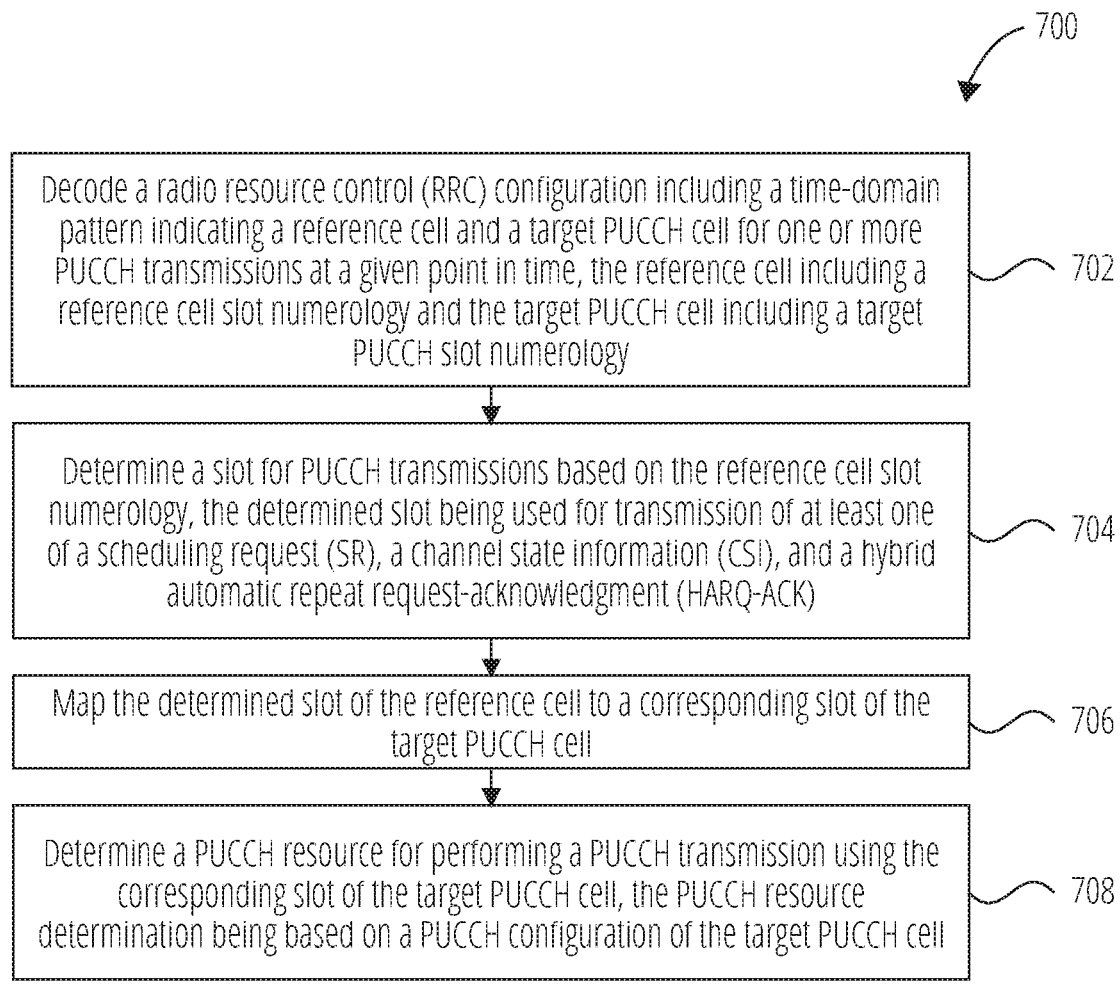
FIG. 7 illustrates a flowchart of a method for physical uplink control channel (PUCCH) carrier switching in accordance with one embodiment.

FIG. 7 illustrates a flowchart of a method 700 for physical uplink control channel (PUCCH) carrier switching at a user equipment (UE). In block 702, the method 700 decodes a radio resource control (RRC) configuration including a time-domain pattern indicating a reference cell and a target PUCCH cell for one or more PUCCH transmissions at a given point in time. The reference cell may include a reference cell slot numerology and the target PUCCH cell may include a target PUCCH cell slot numerology. For instance, the reference cell and the target PUCCH cell(s) may include various slot numerologies, as shown in the examples shown in FIG. 1 through FIG. 6.

In block 704, the method 700 determines a slot for PUCCH transmissions based on the slot numerology of the reference cell. The determined slot may be used for transmission of at least one of a scheduling request (SR), a channel state information (CSI), and a semi-persistent scheduling (SPS) hybrid automatic repeat request-acknowledgment (HARQ-ACK).

In block 706, the method 700 maps the determined slot of the reference cell to a corresponding slot of the target PUCCH cell. For instance, mapping between reference cell slots and target PUCCH cell slots may be performed as shown in the examples of FIG. 4 through FIG. 6 (and as further described herein). In block 708, the method 700 determines a PUCCH resource for performing a PUCCH transmission using the corresponding slot of the target PUCCH cell. For example, the PUCCH resource determination may be based on a PUCCH configuration of the target PUCCH cell.

The method 700 may further include, as part of mapping, identifying that the reference cell slot numerology and the target PUCCH cell slot numerology comprise a same numerology and generating a 1-to-1 mapping between slots of the reference cell and slots of the target PUCCH cell. The method 700 may further include, as part of mapping, identifying that a reference cell subcarrier spacing (SCS) associated with the reference cell is less than a target PUCCH SCS associated with the target PUCCH cell and generating a mapping between slots of the reference cell and slots of the target PUCCH cell. The mapping may include each given reference cell slot being mapped to a single target PUCCH cell slot that overlaps with the given reference cell slot.

The method 700 may further include, as part of mapping, identifying that a reference cell subcarrier spacing (SCS) associated with the reference cell is greater than a target PUCCH SCS associated with the target PUCCH cell and generating a mapping between slots of the reference cell and slots of the target PUCCH cell. The mapping may include a single reference cell slot that overlaps with a given target PUCCH cell slot being mapped to the given target PUCCH cell slot, wherein other reference cell slots that overlap with the given target PUCCH cell slot are dropped.

The method 700 may also include, as part of mapping, identifying that a reference cell subcarrier spacing (SCS) associated with the reference cell is greater than a target PUCCH SCS associated with the target PUCCH cell, generating a first mapping between slots of the reference cell and slots of the target PUCCH cell. The mapping may include a single reference cell slot that overlaps with a given target PUCCH cell slot being mapped to the given target PUCCH cell slot, wherein other reference cell slots that overlap with the given target PUCCH cell slot are dropped. The first mapping may be applied to SR transmissions and CSI transmissions. Mapping may also include generating a second mapping between slots of the reference cell and slots of the target PUCCH cell. The mapping may include each reference cell slot that overlaps with a given target PUCCH cell slot being mapped to the given target PUCCH cell slot. The second mapping may be applied to SPS HARQ-ACK transmissions.

The method 700 may further include identifying that a reference cell subcarrier spacing (SCS) associated with the reference cell is greater than a target PUCCH SCS associated with the target PUCCH cell, wherein the determined slot of the reference cell comprises multiple slots of the reference cell that overlap with the corresponding slot of the target PUCCH cell, and determining that an SR configuration and a CSI configuration each includes multiple PUCCH transmissions scheduled to occur in the multiple slots of the reference cell. Based on determining, an SR transmission associated with the SR configuration or a CSI transmission associated with the CSI configuration may be dropped.

The method 700 may further include the time-domain pattern being associated with a duration of time in which the given point in time occurs. The time-domain pattern may further include a plurality of candidate target PUCCH cells. The target PUCCH cell may comprise one of the plurality of candidate target PUCCH cells. The time-domain pattern may indicate a particular candidate target PUCCH cell from the plurality of candidate target PUCCH cells to be used for PUCCH transmissions at each point in time during the particular duration of time.

The method 700 may also include determining the PUCCH resource further including decoding a resource configuration including a plurality PUCCH resource identifications (IDs), wherein each of the plurality of PUCCH resource IDs corresponds to one of a plurality of candidate target PUCCH cells.

The method 700 may further include determining the PUCCH resource further including interpreting an existing parameter associated with a PUCCH resource identification (ID) based on a PUCCH configuration of the target PUCCH cell. The method 700 may also include determining the PUCCH resource further including decoding a resource configuration including a list of PUCCH resource identifications (IDs), wherein each PUCCH resource ID corresponds to one of a plurality of candidate PUCCH cells included within the RRC configuration.

The method 700 may further include identifying that a reference cell subcarrier spacing (SCS) associated with the reference cell is greater than a target PUCCH SCS associated with the target PUCCH cell, wherein the determined slot of the reference cell comprises multiple slots of the reference cell that overlap with the corresponding slot of the target PUCCH cell. Multiple dynamic HARQ-ACK transmissions may be identified as being scheduled to occur in the multiple slots of the reference cell. A payload of each of the multiple dynamic HARQ-ACK transmissions in the multiple slots of the reference cell may be concatenated in a pre-defined order. Concatenating may include multiplexing the payload of each of the multiple dynamic HARQ-ACK transmissions. A single PUCCH HARQ-ACK transmission may be encoded using the multiplexed payload of each of the multiple dynamic HARQ-ACK transmissions.

The method 700 may further include identifying that a reference cell subcarrier spacing (SCS) associated with the reference cell is greater than a target PUCCH SCS associated with the target PUCCH cell, wherein the determined slot of the reference cell comprises multiple slots of the reference cell that overlap with the corresponding slot of the target PUCCH cell. Multiple semi-persistent scheduling (SPS) HARQ-ACK transmissions may be identified as being scheduled to occur in the multiple slots of the reference cell.

A payload of each of the multiple SPS HARQ-ACK transmissions in the multiple slots of the reference cell may be concatenated in a pre-defined order. Concatenating may include multiplexing the payload of each of the multiple SPS HARQ-ACK transmissions. A single PUCCH HARQ-ACK transmission may be encoded using the multiplexed payload of each of the multiple SPS HARQ-ACK transmissions.

The method 700 may also include the RRC configuration further including a plurality of candidate target PUCCH cells and a time-domain pattern. The target PUCCH cell may comprise one of the plurality of candidate target PUCCH cells. The time-domain pattern indicating a particular candidate target PUCCH cell from the plurality of candidate target PUCCH cells to be used for PUCCH transmissions at each point in time during a particular duration of time.

The method 700 may also include determining the PUCCH resource further including decoding a resource configuration including a list of PUCCH resource identifications (IDs), wherein each PUCCH resource ID corresponds to one of a plurality of candidate target PUCCH cells. The method 700 may also include determining a slot for PUCCH transmissions based on the reference cell slot numerology further including to interpret one or more existing parameters for time domain resource allocation based on the reference cell slot numerology.

Embodiments contemplated herein include an apparatus comprising means to perform one or more elements of the method 700. This apparatus may be, for example, an apparatus of a UE (such as a wireless device 902 that is a UE, as described herein).

Embodiments contemplated herein include one or more non-transitory computer-readable media comprising instructions to cause an electronic device, upon execution of the instructions by one or more processors of the electronic device, to perform one or more elements of the method 700. This non-transitory computer-readable media may be, for example, a memory of a UE (such as a memory 906 of a wireless device 902 that is a UE, as described herein).

Embodiments contemplated herein include an apparatus comprising logic, modules, or circuitry to perform one or more elements of the method 700. This apparatus may be, for example, an apparatus of a UE (such as a wireless device 902 that is a UE, as described herein).

Embodiments contemplated herein include an apparatus comprising: one or more processors and one or more computer-readable media comprising instructions that, when executed by the one or more processors, cause the one or more processors to perform one or more elements of the method 700. This apparatus may be, for example, an apparatus of a UE (such as a wireless device 902 that is a UE, as described herein).

Embodiments contemplated herein include a signal as described in or related to one or more elements of the method 700.

Embodiments contemplated herein include a computer program or computer program product comprising instructions, wherein execution of the program by a processor is to cause the processor to carry out one or more elements of the method 700. The processor may be a processor of a UE (such as a processor(s) 904 of a wireless device 902 that is a UE, as described herein). These instructions may be, for example, located in the processor and/or on a memory of the UE (such as a memory 906 of a wireless device 902 that is a UE, as described herein).

Figure 8:
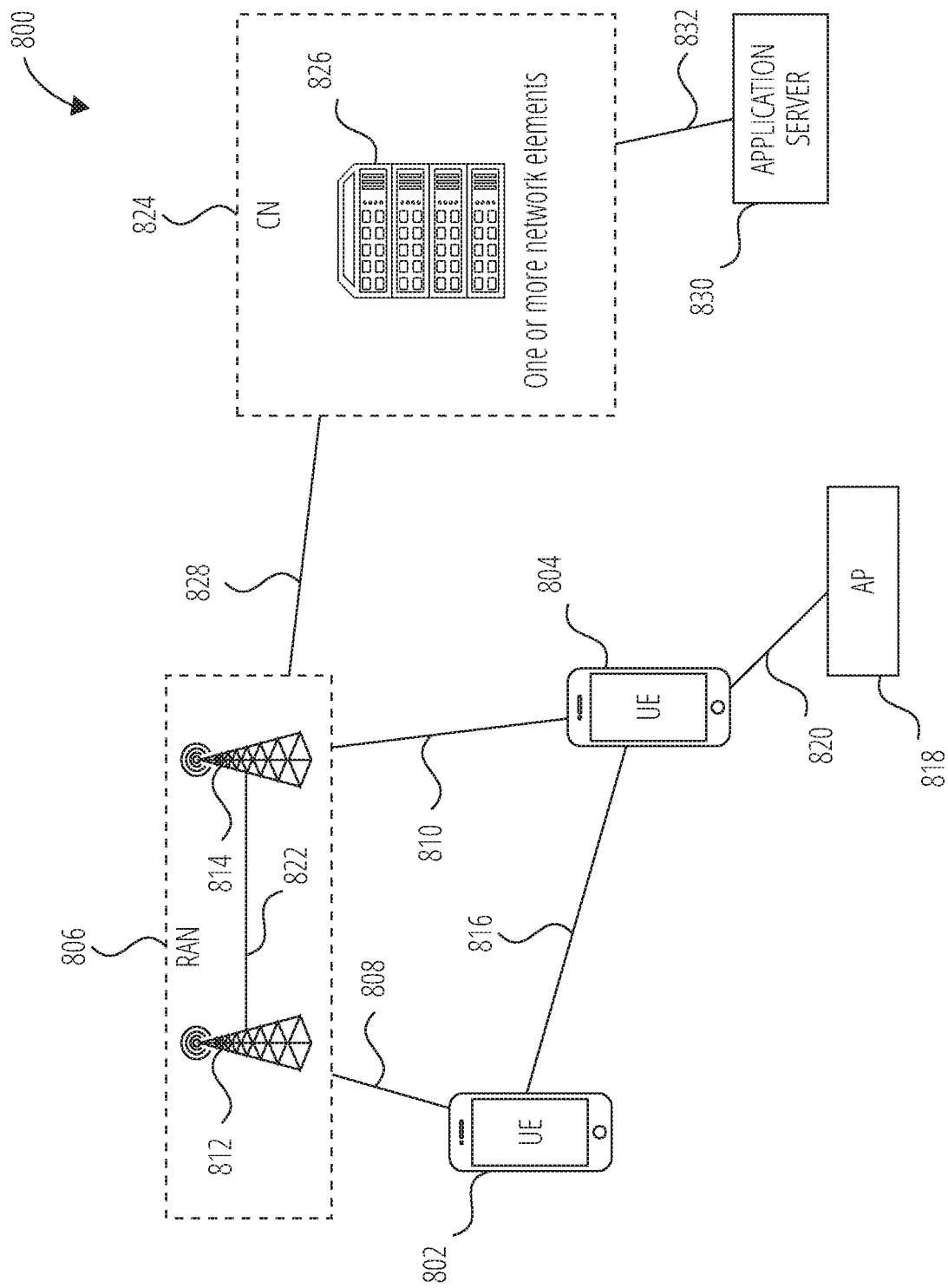
FIG. 8 illustrates an example architecture of a wireless communication system, according to embodiments disclosed herein.

FIG. 8 illustrates an example architecture of a wireless communication system 800, according to embodiments disclosed herein. The following description is provided for an example wireless communication system 800 that operates in conjunction with the LTE system standards and/or 5G or NR system standards as provided by 3GPP technical specifications.

As shown by FIG. 8, the wireless communication system 800 includes UE 802 and UE 804 (although any number of UEs may be used). In this example, the UE 802 and the UE 804 are illustrated as smartphones (e.g., handheld touch-screen mobile computing devices connectable to one or more cellular networks), but may also comprise any mobile or non-mobile computing device configured for wireless communication.

The UE 802 and UE 804 may be configured to communicatively couple with a RAN 806. In embodiments, the RAN 806 may be NG-RAN, E-UTRAN, etc. The UE 802 and UE 804 utilize connections (or channels) (shown as connection 808 and connection 810, respectively) with the RAN 806, each of which comprises a physical communications interface. The RAN 806 can include one or more base stations, such as base station 812 and base station 814, that enable the connection 808 and connection 810.

In this example, the connection 808 and connection 810 are air interfaces to enable such communicative coupling, and may be consistent with RAT(s) used by the RAN 806, such as, for example, an LTE and/or NR.

In some embodiments, the UE 802 and LIE 804 may also directly exchange communication data via a sidelink interface 816. The UE 804 is shown to be configured to access an access point (shown as AP 818) via connection 820. By way of example, the connection 820 can comprise a local wireless connection, such as a connection consistent with any IEEE 902.11 protocol, wherein the AP 818 may comprise a Wi-Fi® router. In this example, the AP 818 may be connected to another network (for example, the Internet) without going through a CN 824.

In embodiments, the UE 802 and UE 804 can be configured to communicate using orthogonal frequency division multiplexing (OFDM) communication signals with each other or with the base station 812 and/or the base station 814 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 812 or base station 814 may be implemented as one or more software entities running on server computers as part of a virtual network. In addition, or in other embodiments, the base station 812 or base station 814 may be configured to communicate with one another via interface 822. In embodiments where the wireless communication system 800 is an LTE system (e.g., when the CN 824 is an EPC), the interface 822 may be an X2 interface. The X2 interface may be defined between two or more base stations (e.g., two or more eNBs and the like) that connect to an EPC, and/or between two eNBs connecting to the EPC. In embodiments where the wireless communication system 800 is an NR system (e.g., when CN 824 is a 5GC), the interface 822 may be an Xn interface. The Xn interface is defined between two or more base stations (e.g., two or more gNBs and the like) that connect to 5GC, between a base station 812 (e.g., a gNB)

connecting to 5GC and an eNB, and/or between two eNBs connecting to 50C (e.g., CN 824).

The RAN 806 is shown to be communicatively coupled to the CN 824. The CN 824 may comprise one or more network elements 826, which are configured to offer various data and telecommunications services to customers/subscribers (e.g., users of UE 802 and UE 804) who are connected to the CN 824 via the RAN 806. The components of the CN 824 may be implemented in one physical device or separate physical devices including components to read and execute instructions from a machine-readable or computer-readable medium (e.g., a non-transitory machine-readable storage medium).

In embodiments, the CN 824 may be an EPC, and the RAN 806 may be connected with the CN 824 via an S1 interface 828. In embodiments, the S1 interface 828 may be split into two parts, an S1 user plane (S1-U) interface, which carries traffic data between the base station 812 or base station 814 and a serving gateway (S-GW), and the S1-MME interface, which is a signaling interface between the base station 812 or base station 814 and mobility management entities (MMEs).

In embodiments, the CN 824 may be a 5GC, and the RAN 806 may be connected with the CN 824 via an NG interface 828. In embodiments, the NG interface 828 may be split into two parts, an NG user plane (NG-U) interface, which carries traffic data between the base station 812 or base station 814 and a user plane function (UPF), and the S1 control plane (NG-C) interface, which is a signaling interface between the base station 812 or base station 814 and access and mobility management functions (AMFs).

Generally, an application server 830 may be an element offering applications that use internet protocol (IP) bearer resources with the CN 824 (e.g., packet switched data services). The application server 830 can also be configured to support one or more communication services (e.g., VoIP sessions, group communication sessions, etc.) for the UE 802 and UE 804 via the CN 824. The application server 830 may communicate with the CN 824 through an IP communications interface 832.

Figure 9:
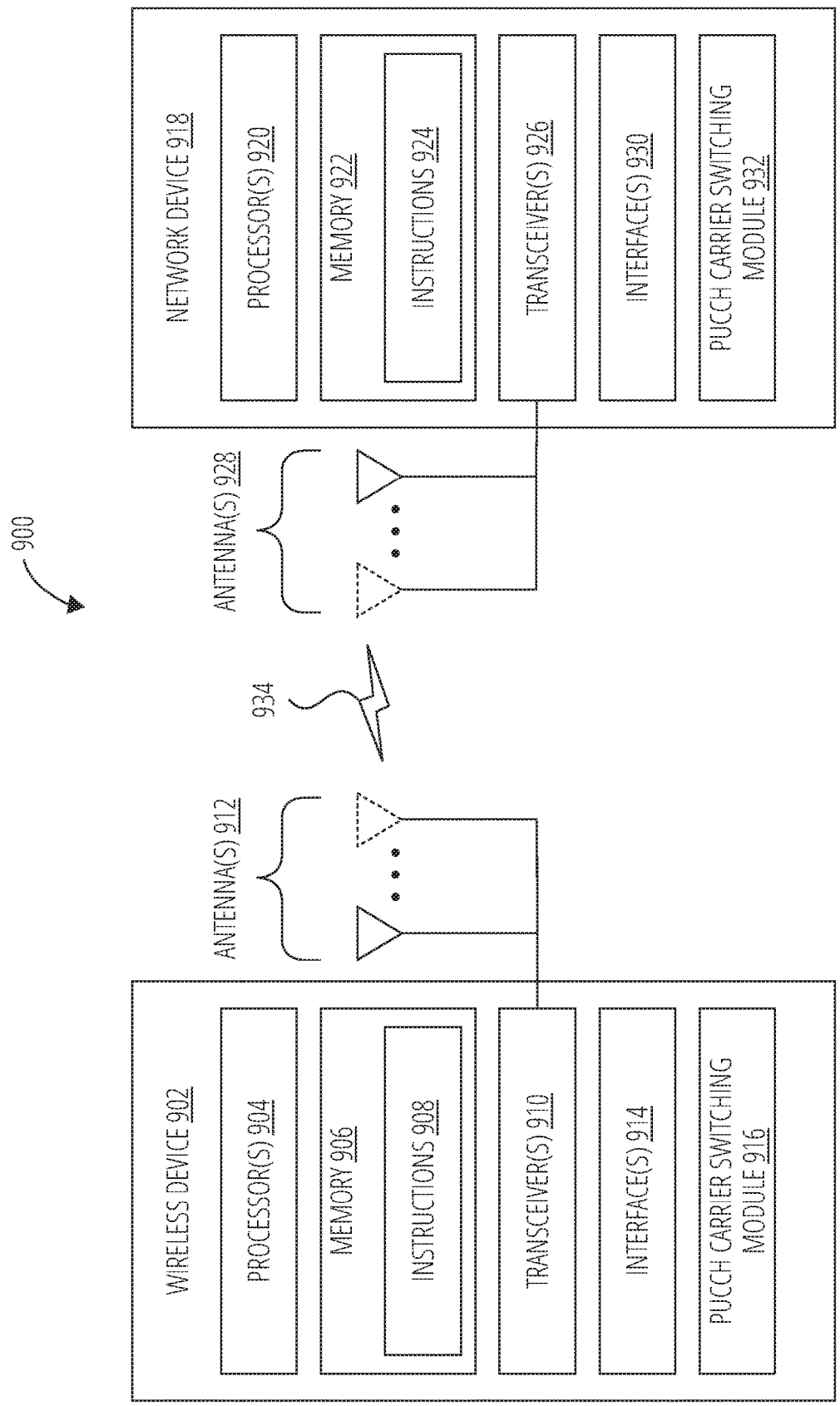
FIG. 9 illustrates a system for performing signaling between a wireless device and a network device, according to embodiments disclosed herein.

FIG. 9 illustrates a system 900 for performing signaling 934 between a wireless device 902 and a network device 918, according to embodiments disclosed herein. The system 900 may be a portion of a wireless communications system as herein described. The wireless device 902 may be, for example, a UE of a wireless communication system. The network device 918 may be, for example, a base station (e.g., an eNB or a gNB) of a wireless communication system.

The wireless device 902 may include one or more processor(s) 904. The processor(s) 904 may execute instructions such that various operations of the wireless device 902 are performed, as described herein. The processor(s) 904 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 902 may include a memory 906. The memory 906 may be a non-transitory computer-readable storage medium that stores instructions 908 (which may include, for example, the instructions being executed by the processor(s) 904). The instructions 908 may also be referred to as program code or a computer program. The memory 906 may also store data used by, and results computed by, the processor(s) 904.

The wireless device 902 may include one or more transceiver(s) 910 that may include radio frequency (RF) transmitter and/or receiver circuitry that use the antenna(s) 912 of the wireless device 902 to facilitate signaling (e.g., the signaling 934) to and/or from the wireless device 902 with other devices (e.g., the network device 918) according to corresponding RATs.

The wireless device 902 may include one or more antenna(s) 912 (e.g., one, two, four, or more). For embodiments with multiple antenna(s) 912, the wireless device 902 may leverage the spatial diversity of such multiple antenna(s) 912 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 902 may be accomplished according to precoding (or digital beamforming) that is applied at the wireless device 902 that multiplexes the data streams across the antenna(s) 912 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 902 may implement analog beamforming techniques, whereby phases of the signals sent by the antenna(s) 912 are relatively adjusted such that the (joint) transmission of the antenna(s) 912 can be directed (this is sometimes referred to as beam steering).

The wireless device 902 may include one or more interface(s) 914. The interface(s) 914 may be used to provide input to or output from the wireless device 902. For example, a wireless device 902 that is a UE may include interface(s) 914 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 910/antenna(s) 912 already described) that allow for communication between the UE and other devices and may operate according to known protocols (e.g., Wi-Fi®, Bluetooth®, and the like).

The wireless device 902 may include a PUCCH carrier switching module 916. The PUCCH carrier switching module 916 may be implemented via hardware, software, or combinations thereof. For example, the PUCCH carrier switching module 916 may be implemented as a processor, circuit, and/or instructions 908 stored in the memory 906 and executed by the processor(s) 904. In some examples, the PUCCH carrier switching module 916 may be integrated within the processor(s) 904 and/or the transceiver(s) 910. For example, the PUCCH carrier switching module 916 may be implemented by a combination of software components (e.g., executed by a DSP or a general processor) and hardware components (e.g., logic gates and circuitry) within the processor(s) 904 or the transceiver(s) 910.

The PUCCH carrier switching module 916 may be used for various aspects of the present disclosure, for example, aspects of FIGS. 1 through 7. The PUCCH carrier switching module 916 is configured to determine reference cell numerology, map reference cell slots to target PUCCH cell slots, determine PUCCH resources, perform UCI multiplexing, and so forth.

The network device 918 may include one or more processor(s) 920. The processor(s) 920 may execute instructions such that various operations of the network device 918 are performed, as described herein. The processor(s) 904 may include one or more baseband processors implemented using, for example, a CPU, a DSP, an ASIC, a controller, an FPGA device, another hardware device, a firmware device, or any combination thereof configured to perform the operations described herein.

The network device 918 may include a memory 922. The memory 922 may be a non-transitory computer-readable storage medium that stores instructions 924 (which may include, for example, the instructions being executed by the processor(s) 920). The instructions 924 may also be referred to as program code or a computer program. The memory 922 may also store data used by, and results computed by, the processor(s) 920.

The network device 918 may include one or more transceiver(s) 926 that may include RF transmitter and/or receiver circuitry that use the antenna(s) 928 of the network device 918 to facilitate signaling (e.g., the signaling 934) to and/or from the network device 918 with other devices (e.g., the wireless device 902) according to corresponding RATs.

The network device 918 may include one or more antenna(s) 928 (e.g., one, two, four, or more). In embodiments having multiple antenna(s) 928, the network device 918 may perform MIMO, digital beamforming, analog beamforming, beam steering, etc., as has been described.

The network device 918 may include one or more interface(s) 930. The interface(s) 930 may be used to provide input to or output from the network device 918. For example, a network device 918 that is a base station may include interface(s) 930 made up of transmitters, receivers, and other circuitry (e.g., other than the transceiver(s) 926/antenna(s) 928 already described) that enables the base station to communicate with other equipment in a core network, and/or that enables the base station to communicate with external networks, computers, databases, and the like for purposes of operations, administration, and maintenance of the base station or other equipment operably connected thereto.

The network device 918 may include a PUCCH carrier switching module 932. The PUCCH carrier switching module 932 may be implemented via hardware, software, or combinations thereof. For example, the PUCCH carrier switching module 932 may be implemented as a processor, circuit, and/or instructions 924 stored in the memory 922 and executed by the processor(s) 920. In some examples, the PUCCH carrier switching module 932 may be integrated within the processor(s) 920 and/or the transceiver(s) 926. For example, the PUCCH carrier switching module 932 may be implemented by a combination of software components (e.g., executed by a DSP or a general processor) and hardware components (e.g., logic gates and circuitry) within the processor(s) 920 or the transceiver(s) 926.

The PUCCH carrier switching module 932 may be used for various aspects of the present disclosure, for example, aspects of FIGS. 1 through 7. The PUCCH carrier switching module 932 is configured to assist UEs in performing PUCCH carrier switching.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A user equipment (UE) comprising:
a processor; and
a memory storing instructions that, when executed by the processor, configure the UE to:
decode a radio resource control (RRC) configuration including a time-domain pattern indicating a reference cell and a target PUCCH cell for one or more PUCCH transmissions at a given point in time, the reference cell including a reference cell slot numerology and the target PUCCH cell including a target PUCCH slot numerology;

determine a determined slot for PUCCH transmissions based on the reference cell slot numerology, the determined slot being used for transmission of at least one of a scheduling request (SR), a channel state information (CSI), and a hybrid automatic repeat request-acknowledgment (HARQ-ACK);

map the determined slot of the reference cell to a corresponding slot of the target PUCCH cell; and determine a PUCCH resource for performing a PUCCH transmission using the corresponding slot of the target PUCCH cell, the PUCCH resource determination being based on a PUCCH configuration of the target PUCCH cell.

2. The UE of claim 1, wherein to map further includes to: identify that the reference cell slot numerology and the target PUCCH cell slot numerology comprise a same numerology; and generate a 1-to-1 mapping between first slots of the reference cell and second slots of the target PUCCH cell.

3. The UE of claim 1, wherein to map further includes to: identify that a reference cell subcarrier spacing (SCS) associated with the reference cell is less than a target PUCCH SCS associated with the target PUCCH cell; and generate a mapping between first slots of the reference cell and second slots of the target PUCCH cell, the mapping including each given reference cell slot being mapped to a single target PUCCH cell slot that overlaps with the given reference cell slot.

4. The UE of claim 1, wherein to map further includes to: identify that a reference cell subcarrier spacing (SCS) associated with the reference cell is greater than a target PUCCH SCS associated with the target PUCCH cell; and generate a mapping between first slots of the reference cell and second slots of the target PUCCH cell, the mapping including a single reference cell slot that overlaps with a given target PUCCH cell slot being mapped to the given target PUCCH cell slot, wherein other reference cell slots that overlap with the given target PUCCH cell slot are dropped.

5. The UE of claim 1, wherein to map further includes to: identify that a reference cell subcarrier spacing (SCS) associated with the reference cell is greater than a target PUCCH SCS associated with the target PUCCH cell;

generate a first mapping between first slots of the reference cell and second slots of the target PUCCH cell, the first mapping including a single reference cell slot that overlaps with a given target PUCCH cell slot being mapped to the given target PUCCH cell slot, wherein other reference cell slots that overlap with the given target PUCCH cell slot are dropped, the first mapping being applied to SR transmissions and CSI transmissions; and generate a second mapping between the first slots of the reference cell and the second slots of the target PUCCH cell, the second mapping including each reference cell slot that overlaps with the given target PUCCH cell slot being mapped to the given target PUCCH cell slot, the second mapping being applied to SPS HARQ-ACK transmissions.

6. The UE of claim 1, wherein the instructions, when executed by the processor, configure the UE to:
identify that a reference cell subcarrier spacing (SCS) associated with the reference cell is greater than a target PUCCH SCS associated with the target PUCCH cell, wherein the determined slot of the reference cell comprises multiple slots of the reference cell that overlap with the corresponding slot of the target PUCCH cell;

determine that an SR configuration and a CSI configuration each includes multiple PUCCH transmissions scheduled to occur in the multiple slots of the reference cell; and based on determining, dropping an SR transmission associated with the SR configuration or dropping a CSI transmission associated with the CSI configuration.

7. The UE of claim 1, wherein the time-domain pattern is associated with a duration of time in which the given point in time occurs, the time-domain pattern further including a plurality of candidate target PUCCH cells, the target PUCCH cell comprising one of the plurality of candidate target PUCCH cells, the time-domain pattern indicating a particular candidate target PUCCH cell from the plurality of candidate target PUCCH cells to be used for PUCCH transmissions at each point in time during the duration of time.

8. The UE of claim 7, wherein determining the PUCCH resource further includes decoding a resource configuration including a plurality PUCCH resource identifications (IDs), wherein each of the plurality of PUCCH resource IDs corresponds to one of a plurality of candidate target PUCCH cells.

9. A method for physical uplink control channel (PUCCH) carrier switching at a user equipment (UE), the method comprising:

decoding a radio resource control (RRC) configuration including a time-domain pattern indicating a reference cell and a target PUCCH cell for one or more PUCCH transmissions at a given point in time, the reference cell including a reference cell slot numerology and the target PUCCH cell including a target PUCCH cell slot numerology;

determining a determined slot for PUCCH transmissions based on the reference cell slot numerology, the determined slot being used for transmission of at least one of a scheduling request (SR), a channel state information (CSI), and a hybrid automatic repeat request-acknowledgment (HARQ-ACK);

mapping the determined slot of the reference cell to a corresponding slot of the target PUCCH cell; and determining a PUCCH resource for performing a PUCCH transmission using the corresponding slot of the target PUCCH cell, the PUCCH resource determination being based on a PUCCH configuration of the target PUCCH cell.

10. The method of claim 9, wherein determining the PUCCH resource further includes interpreting an existing parameter associated with a PUCCH resource identification (ID) based on a PUCCH configuration of the target PUCCH cell.

11. The method of claim 9, wherein determining the PUCCH resource further includes decoding a resource configuration including a list of PUCCH resource identifications (IDs), wherein each PUCCH resource ID corresponds to one of a plurality of candidate PUCCH cells included within the RRC configuration.

12. The method of claim 9, further comprising:
identifying that a reference cell subcarrier spacing (SCS) associated with the reference cell is greater than a target PUCCH SCS associated with the target PUCCH cell, wherein the determined slot of the reference cell comprises multiple slots of the reference cell that overlap with the corresponding slot of the target PUCCH cell;
identifying that multiple dynamic HARQ-ACK transmissions are scheduled to occur in the multiple slots of the reference cell;
concatenating a payload of each of the multiple dynamic HARQ-ACK transmissions in the multiple slots of the reference cell in a pre-defined order, concatenating including multiplexing the payload of each of the multiple dynamic HARQ-ACK transmissions; and
encoding a single PUCCH HARQ-ACK transmission using the multiplexed payload of each of the multiple dynamic HARQ-ACK transmissions.

13. The method of claim 9, further comprising:
identifying that a reference cell subcarrier spacing (SCS) associated with the reference cell is greater than a target PUCCH SCS associated with the target PUCCH cell, wherein the determined slot of the reference cell comprises multiple slots of the reference cell that overlap with the corresponding slot of the target PUCCH cell;
identifying that multiple semi-persistent scheduling (SPS) HARQ-ACK transmissions are scheduled to occur in the multiple slots of the reference cell;
concatenating a payload of each of the multiple SPS HARQ-ACK transmissions in the multiple slots of the reference cell in a pre-defined order, concatenating including multiplexing the payload of each of the multiple SPS HARQ-ACK transmissions; and
encoding a single PUCCH HARQ-ACK transmission using the multiplexed payload of each of the multiple SPS HARQ-ACK transmissions.

14. A non-transitory computer-readable storage medium, the computer-readable storage medium including instructions that when executed by a processor of a user equipment (UE), cause the processor to:
decode a radio resource control (RRC) configuration including a time-domain pattern indicating a reference cell and a target PUCCH cell for one or more PUCCH transmissions at a given point in time, the reference cell including a reference cell slot numerology and the target PUCCH cell including a target PUCCH cell slot numerology;
determine a determined slot for PUCCH transmissions based on the slot numerology of the reference cell, the determined slot being used for transmission of at least one of a scheduling request (SR), a channel state information (CSI), and a hybrid automatic repeat request-acknowledgment (HARQ-ACK);
map the determined slot of the reference cell to a corresponding slot of the target PUCCH cell; and
determine a PUCCH resource for performing a PUCCH transmission using the corresponding slot of the target PUCCH cell, the PUCCH resource determination being based on a PUCCH configuration of the target PUCCH cell.

15. The non-transitory computer-readable storage medium of claim 14, wherein to map further includes to:
identify that the reference cell slot numerology and the target PUCCH cell slot numerology comprise a same numerology; and
generate a 1-to-1 mapping between first slots of the reference cell and second slots of the target PUCCH cell.

16. The non-transitory computer-readable storage medium of claim 14, wherein to map further includes to:
identify that a reference cell subcarrier spacing (SCS) associated with the reference cell is less than a target PUCCH SCS associated with the target PUCCH cell; and
generate a mapping between first slots of the reference cell and second slots of the target PUCCH cell, the mapping including each given reference cell slot being mapped to a single target PUCCH cell slot that overlaps with the given reference cell slot.

17. The non-transitory computer-readable storage medium of claim 14, wherein to map further includes to:
identify that a reference cell subcarrier spacing (SCS) associated with the reference cell is greater than a target PUCCH SCS associated with the target PUCCH cell; and
generate a mapping between first slots of the reference cell and second slots of the target PUCCH cell, the mapping including a single reference cell slot that overlaps with a given target PUCCH cell slot being mapped to the given target PUCCH cell slot, wherein other reference cell slots that overlap with the given target PUCCH cell slot are dropped.

18. The non-transitory computer-readable storage medium of claim 14, wherein to map further includes to:
identify that a reference cell subcarrier spacing (SCS) associated with the reference cell is greater than a target PUCCH SCS associated with the target PUCCH cell;
generate a first mapping between first slots of the reference cell and second slots of the target PUCCH cell, the first mapping including a single reference cell slot that overlaps with a given target PUCCH cell slot being mapped to the given target PUCCH cell slot, wherein other reference cell slots that overlap with the given target PUCCH cell slot are dropped, the first mapping being applied to SR transmissions and CSI transmissions; and
generate a second mapping between the first slots of the reference cell and the second slots of the target PUCCH cell, the second mapping including each reference cell slot that overlaps with the given target PUCCH cell slot being mapped to the given target PUCCH cell slot, the second mapping being applied to semi-persistent scheduling (SPS) HARQ-ACK transmissions.

19. The non-transitory computer-readable storage medium of claim 14, wherein the RRC configuration further includes a plurality of candidate target PUCCH cells and a time-domain pattern, the target PUCCH cell comprising one of the plurality of candidate target PUCCH cells, the time-domain pattern indicating a particular candidate target PUCCH cell from the plurality of candidate target PUCCH cells to be used for PUCCH transmissions at each point in time during a particular duration of time.

20. The non-transitory computer-readable storage medium of claim 19, wherein determining the PUCCH resource further includes decoding a resource configuration including a list of PUCCH resource identifications (IDs), wherein each PUCCH resource ID corresponds to one of a plurality of candidate target PUCCH cells.

* * * * *